Jan. 6, 1942.  J. A. BROOKS  2,268,855
LAWN SPRINKLING APPARATUS
Filed Jan. 20, 1940
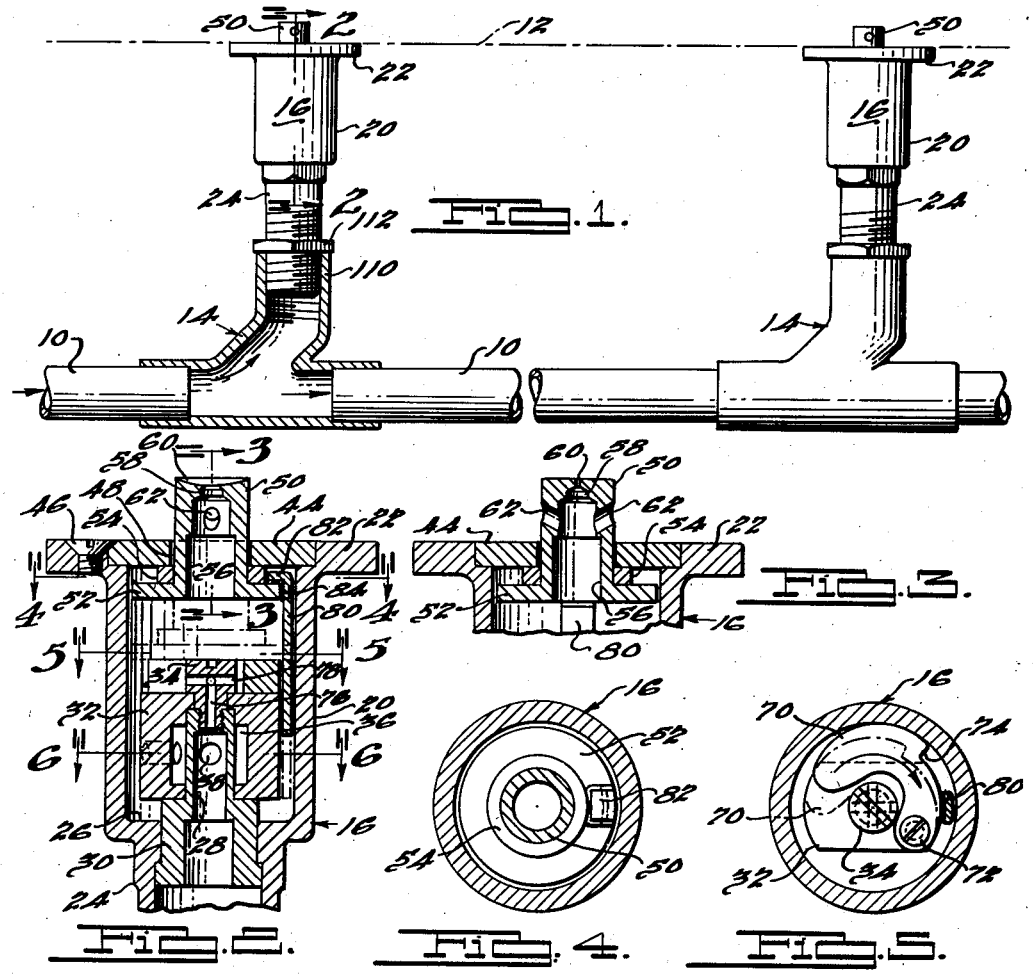
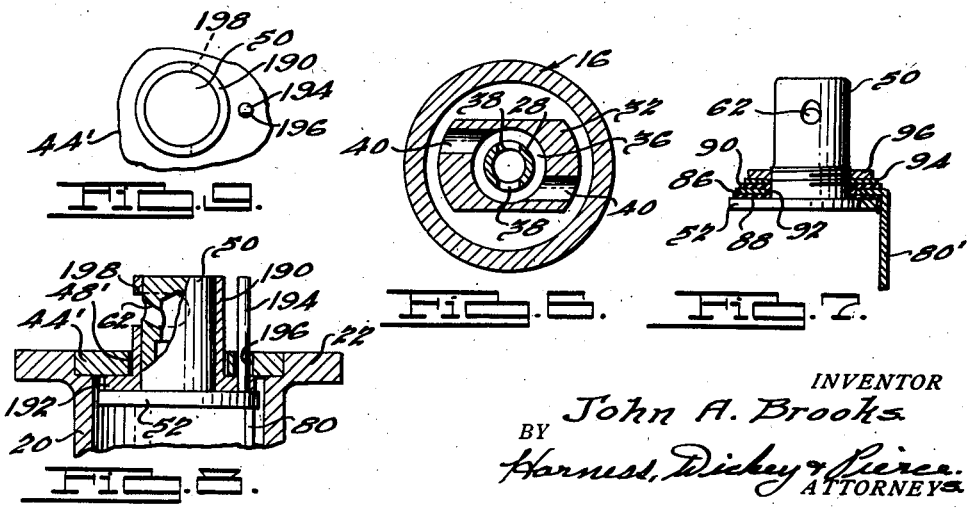
INVENTOR
John A. Brooks
BY
Harness, Dickey & Pierce
ATTORNEYS Patented Jan. 6, 1942

2,268,855

UNITED STATES PATENT OFFICE 2,268,855

LAWN SPRINKLING APPARATUS

John A. Brooks, Detroit, Mich.

Application January 20, 1940, Serial No. 314,778

15 Claims. (Cl. 299—61)

This invention relates to lawn sprinkling apparatus and has particular relation to the sprinkling heads thereof as well as to the mounting of such heads, the principal object being the provision of apparatus of the type described that permits greater economies in the installation of such systems, as well as in the adjustment thereof in service.

Objects of the invention include the provision of a sprinkler head for a lawn sprinkling system so constructed and arranged as to permit a single sprinkler head to cover a much greater area than has heretofore been possible in conventional types of heads; the provision of a lawn sprinkler head so constructed and arranged as to discharge water therefrom in one or more streams together with novel mechanism for causing a slow rotational movement of such streams about the axis of the head; the provision of a lawn sprinkler head of the type described which is adapted to be imbedded in flush relationship with respect to the surface of the lawn together with a rotatable nozzle member that is automatically elevated above the surface of the lawn when water or pressure is applied to the nozzle and is automatically retracted when the pressure is relieved; the provision of a lawn sprinkler head including a body and a nozzle member rotatable therein, together with turbine means for effecting rotation of the nozzle member in the body; the provision of a construction as last described in which a novel form of speed reducing mechanism is provided between the turbine and the nozzle member; and the provision of a construction as above described in which the arc of effective operation of the sprinkler head may be varied as desired, to suit any particular condition, in a simple and efficient manner.

Further objects of the invention include the provision of a new and novel means for connecting a lawn sprinkler head with its underground supply line, enabling adjustment of the vertical height of the sprinkler head with respect to the surface of the lawn in a simple and efficient manner; and the provision of a connection between a sprinkler head and its supply line enabling vertical adjustment of the sprinkler head with respect to the supply line without requiring removal and replacement of connecting nipples in the manner now necessary in conventional constructions.

The above being among the objects of the present invention, the same consists in certain novel features of construction and combinations of parts to be hereinafter described with reference to the accompanying drawing, and then claimed, having the above and other objects in view.

In the accompanying drawing which illustrates suitable embodiments of the present invention and in which like numerals refer to like parts throughout the several different views:

Fig. 1 is a fragmentary, partially broken, partially sectioned side elevational view of a pair of lawn sprinkler heads shown connected with a water supply line in accordance with one phase of the present invention;

Fig. 2 is an enlarged vertical sectional view taken through one of the sprinkler heads shown in Fig. 1, as on the line 2—2 thereof and illustrating the details of construction thereof;

Fig. 3 is a fragmentary vertical sectional view taken on the line 3—3 of Fig. 2 and further illustrating details of the spray nozzle therefor;

Fig. 4 is a transverse sectional view taken on the line 4—4 of Fig. 2;

Fig. 5 is a transverse sectional view taken on the line 5—5 of Fig. 2;

Fig. 6 is a transverse sectional view taken on the line 6—6 of Fig. 2;

Fig. 7 is a partially broken, partially sectioned side elevational view of a modified form of nozzle member adapted for use in any of the sprinkler head construction shown;

Fig. 8 is a fragmentary vertical sectional view taken through the upper portion of a sprinkler head such as illustrated in Fig. 2 and illustrating the means employed for limiting the arc of effective operation of the sprinkler head to less than a full circle; and, Fig. 9 is a fragmentary plan view of the construction shown in Fig. 8.

The sprinkler heads of the present invention are applicable to both the mobile, above ground type as well as to the permanent buried or underground type, the only major difference which would ordinarily be made in the two types, although not at all necessary, being that in the mobile type there would be no necessity for providing for upward projection of the nozzle member upon the application of water pressure thereto. The underground or buried type of sprinkler head ordinarily requiring vertical projection of the nozzle member above the surface of the lawn during operation is shown in the accompanying drawing by way of illustration of the broad invention, and also because of the fact that the advantages of the present invention are perhaps more pronounced in the underground type of system.

In the present type of underground sprinkling systems for lawns the spray heads commonly employed are of the fixed nozzle type discharging a spray of water simultaneously over all of the area covered by the sprinkler head. It will be understood that this area may comprise a full circle or any part of such circle depending upon the particular conditions to be met with in installation. Because of the fact that such nozzles sprinkle all of the area treated thereby at one time, it necessarily follows that each sprinkler head uses a relatively large amount of water. This is not important, except from the cost standpoint, where there is an unlimited supply of water available in mains or lines of sufficient size as to enable a relatively large group of such nozzles to be operated at a single time. However, in the majority of residences a three-quarter inch pipe is employed to connect the house with the supply main in the street or like location, and in such event the number of spray heads that can be simultaneously operated is limited to that number which may be properly supplied through the three-quarter inch pipe. Ordinarily under such conditions and with the water pressures usually employed in most cities, a group of not more than four full spray heads may be operated simultaneously and not more than five half spray heads. Such water pressure is usually in the neighborhood of 45 to 50 pounds per square inch gauge at the water meter and this is reduced to an effective pressure of approximately 25 pounds per square inch at each sprinkler head of such group. Inasmuch as the area covered by each of such spray heads under a water pressure of approximately 25 pounds per square inch gauge is that lying within a radius of from eight to nine feet from the sprinkler head, it will be appreciated that the area which can be sprinkled at one time is relatively limited. Furthermore with spray heads of the conventional type and with the relatively limited area of coverage, it will be appreciated that in a lawn of material area a relatively large number of such heads may be employed and that the initial expense of installing such heads is necessarily relatively great.

It is the principal object of the present invention to provide a sprinkler head construction which will permit an area to be sprinkled thereby greatly in excess of that possible with spray heads as now commonly employed. At the same time the amount of water required to operate each spray head may be reduced as compared to spray heads as conventionally employed although obviously the amount of water required by each spray head may be readily controlled by varying the size of the discharge opening or openings in the spray head. This advantageous feature of the present invention is obtained by providing a construction which, instead of attempting to simultaneously sprinkle all of the area covered by the spray head, covers only a small proportion or segmental increment of such area, but covers each increment of such area in succession until all of the area covered by the head has been repeatedly sprinkled. This is accomplished by providing a spray head which discharges the water therefrom in one or more relatively small streams each of which preferably acts over only a relatively small segment of the entire area to be sprinkled but over a greater radius than conventional spray heads, and slowly rotating the sprinkler head about its vertical axis so that such relatively small stream or streams is gradually caused to cover all of the desired area within the range of the head.

Referring now to the accompanying drawing and particularly to Fig. 1, the numeral 10 indicates a water supply line for a group or series of spray heads and, for an underground sprinkling system, will be buried in the earth of the lawn to be sprinkled and the surface of which lawn is indicated in Fig. 1 by the line 12. At intervals along the length of the line 10 corresponding with the desired spacing of one spray head from the next, Ys indicated generally at 14 are provided to the upper end of which a spray head indicated generally in Fig. 1 as at 16 is suitably connected and positioned with the upper surface of its body preferably flush with the surface 12 of the ground.

As previously mentioned, in the conventional type of spray which simultaneously covers the entire area to be treated thereby and which area will lie in a radius of approximately eight to nine feet from the sprinkler head where the available water pressure at the heads is in the neighborhood of 25 pounds per square inch gauge, the heads 16 are spaced from one another by a distance of approximately sixteen feet. Under the same circumstances by the employment of sprinkler heads constructed in accordance with the present invention, the sprinkler heads 16 may be spaced from one another by a distance of sixty feet. Inasmuch as the sprinkled area covered by the spray head varies as the square of the effective radius it will thus be apparent that with this improved spray head an area is covered approximately sixteen times as great as that covered by a conventional type of spray head, and this without necessitating a greater flow of water through each head. Of course, it will take a longer period to distribute the same volume of water over a specified area with this improved spray head as compared to the time required in a spray head of conventional construction, but this is not important when compared to the savings in initial cost of installation as obviously it will require a much smaller number of spray heads and a materially lesser amount of piping connecting the same in the employment of the present invention as compared to the employment of conventional constructions.

Referring now to Figs. 2 to 6, inclusive, it will be understood that the spray head shown in these views is of the type that will sprinkle a complete circular area. Each head 16 comprises a hollow cylindrical body portion 20 having a radially outwardly extending annular flange 22 at its upper end the upper surface of which is preferably positioned in flush relationship with respect to the surface of the lawn to which it is applied.

The lower end of the body 20 is reduced as at 24 thus forming an internal shoulder 26 within the the body, this being merely a matter of convenience and not a necessity of design as will be readily appreciated by those skilled in the art. Projecting upwardly from the plane of the shoulder 26 is a hollow stationary tube 28 positioned centrally of the housing 20. While this tube 28 may be formed integrally with the body 20 or formed separately therefrom and secured in position in any suitable manner, as a matter of illustration in the present case it is shown as being formed integrally with and projecting above the upper end of a hollow plug 30 which is pressed upwardly into position in the bore of the lower portion 24 of the housing 20 and with the upper end of the plug 30 projecting a slight distance above the shoulder 26. Rotatably received upon the tube 28 and resting against the shoulder formed between the same and the upper end of the plug 30 is a rotating power element 32 designated herein as a turbine. It is maintained against upward axial displacement on the tube 28 by means of a screw 34 which is threaded into the upper end of the tube 28 with its head partially overlying the upper surface of the turbine 32.

The bore of the turbine 32 is centrally provided between its ends with an annular recess 36 which cooperates with the outer surface of the tube 28 to form an annular chamber also designated at 36. One or more holes 38 in the tube 28 communicate the hollow interior thereof with such chamber 36. As best illustrated in Figs. 2 and 6 the turbine 32 is of a cross-sectional contour similar to that of a circle having its diametrically opposite sides flattened off and one or more openings 40 are provided in the turbine 32 and extending from the radially outer face thereof to the chamber 36 in generally parallel relationship with respect to the flattened side of the turbine and in more or less tangent relationship with respect to the chamber 36. The openings 40 thus provide discharge openings in the turbine 32 positioned in off-center relationship with respect to the axis thereof so that when water is discharged outwardly through the openings 40 from the chamber 36 the reaction to the flow of such water through the openings 40 will cause the turbine 32 to rotate in a clockwise direction of rotation as viewed in Fig. 6. The water for operating the turbine 32 is introduced into the lower portion 24 of the body 20 and flows up through the hollow plug 30 and through the tube 28 and thence through the openings 38 into the chamber 36 from which it flows outwardly through the openings 40 to the interior of the body 20 above the shoulder 26.

The upper open end of the body 20 is closed by a plate or disc 44 preferably set into flush relationship with respect to the upper surface of the flange 22 and rigidly secured in place by means of screws 46. The disc 44 is centrally provided with an opening 48 through which the nozzle member 50 is projectable and in which it is rotatable. The nozzle member 50 is of generally cylindrical nature having a radially outwardly directed annular flange 52 at its lower end which underlies the disc 44 and coacts with the disc 44 to limit the extent of upward movement of the nozzle member 50 in the opening 48. Preferably, but not necessarily, a washer 54 circles the nozzle member 50 between the disc 44 and the flange 52 and serves as a spacer to limit the approach of the flange 52 with respect to the disc 44. Although the washer member 54 may be formed integrally with the nozzle member 50, if desired, it is preferably formed separately therefrom and simply inserted in place.

The nozzle member 50 is provided with a bore 56 therein which is reduced in diameter at its upper end as at 58 and a relatively narrow saw cut or slot 60 extending through the upper extremity of the nozzle member 50 intersects the reduced portion 58 to provide a relatively small fan-like discharge of water from the nozzle to cover the central area serviced by the spray head during operation. The nozzle member 50 is provided with at least one or more and preferably two main discharge orifices 62, preferably extending upwardly and outwardly with respect to the axis of the nozzle member 50 as best illustrated in Fig. 3.

It will be appreciated that the nozzle member 50 is illustrated in Figs. 1, 2 and 3 in full lines in its projected or operative position in which case the orifices 62 in the nozzle member 50 are positioned vertically above the upper surface of the disc 44. When the water pressure in the system is relieved the force of gravity will act upon the nozzle member 50 to cause it to drop until its lower end seats upon the upper surface of the screw 34, as indicated in dotted lines in Fig. 2, at which time the upper end of the nozzle member 50 will lie in substantially flush relationship with respect to the upper surface of the disc 44. It will also be appreciated that when the nozzle member 50 is in its inoperative position, if water under pressure is introduced into the spray head the pressure of the water will cause the nozzle member 50 to rise to the position indicated in solid lines in Figs. 2 and 3.

It will be understood from the foregoing that the stream of water issuing from each of the orifices 62 in the nozzle member 50 will be effective at any particular moment to discharge water upon a relatively small segmental area about the axis of the sprinkler head and that because of its nature the effective application of water from such stream to the lawn will begin at some distance from the axis of the sprinkler head. The fan shaped stream of water issuing from the slot 60 will take care of that area immediately adjacent the sprinkler head over which the stream of water issuing from each of the orifices 62 is not effective, but this fan shaped stream of water from the slot 60 will, like the stream from each of the orifices 62, act at any one moment over a relatively small segmental area of the total surface to be treated. Accordingly, in order to effect application of the water to the entire area to be serviced by the sprinkler head, the nozzle member 50 must be rotated so as to distribute the water from the nozzle over each increment of segmental area of the entire surface to be covered, in succession.

The turbine 32 is employed for effecting rotation of the nozzle member 50. Because of the relatively small size and proportionate small power of the turbine 32, and because of the large amount of resistance set up to turning of the nozzle member 50 due to the friction set up between the nozzle member 50 and the disc 44 due to the water pressure within the body 20, it would be impossible to drive the nozzle member 50 directly from the turbine 32 at the same speed of rotation. Furthermore, it would be undesirable to attempt to rotate the nozzle member 50 at any high rate of rotation not only from the standpoint of resulting rapid wear but also because of the accompanying inefficiency of the sprinkling action. Accordingly, some form of speed reducing mechanism must be employed between the turbine 32 and the nozzle member 50 which will permit the turbine 32 to rotate at a relatively high speed of rotation and yet cause the nozzle member 50 to rotate only slowly. In this respect it is preferable that the nozzle member make a complete revolution in from one to three minutes, although this figure may, of course, be varied to meet the desires of the individual designer.

In order to effect this speed reducing drive between the turbine 32 and the nozzle member 50, the following mechanism is provided. To the axially upper face of the turbine 32 a more or less semi-annular impact member 70 is pivoted at one end thereof as by means of a screw 72, as best shown in Fig. 5. The radially outer surface of the impact member 70 over approximately half of its length and at the pivoted end thereof is cut away so as to form a radial shoulder 74. The proportions of the impact member 70 are such that it is permitted a limited amount of pivotal movement about the axis of the screw 72 so as to permit a corresponding amount of radial movement of the shoulder 74. The impact member 70 is preferably of substantial thickness so as to impart a reasonable amount of mass to the same. It will be appreciated that as the turbine 32 rotates the effect of centrifugal force on the impact member 70 will tend to throw it out into contact with the inner wall of the body 20. However, rather than to depend entirely upon the centrifugal force due to rotation of the impact member 70 with the turbine 32 to effect this result, it is preferable to provide the screw 34 with an axial bore 76, as best illustrated in Fig. 2, which communicates with a plurality of cross-passages 78 in the head of the screw 34 so that the water under pressure flowing into the bore of the tube 28 will pass upwardly into the bore 76 of the screw 34 and, flowing outwardly through the passages 78, act against the radially inner face of the inertia member 70 and tend to force it radially outwardly into contact with the inner wall of the body 20.

The nozzle member 50 is provided with a downwardly extending arm or lug 80 fixed thereto and lying in closely adjacent but preferably slightly spaced relation with respect to the inner wall of the body 20. The arm 80 extends downwardly to a point below the impact member 70 when the nozzle member 50 is in elevated position. The arm 80 is, therefore, positioned in intersecting relationship with respect to the path of movement of the shoulder 74 of the impact member 70 during rotation of the latter with the turbine 32. Accordingly, when the turbine 32 rotates, carrying the impact member 70 with it, upon each rotation of the turbine 32 the shoulder 74 of the impact member 70 will strike the arm 80 and tend to cause rotation thereof and to carry therewith the nozzle member 50. However, as previously described, because of the fact that the water pressure in the body 20 when the head is in operation presses the flange 52 of the nozzle member 50 upwardly against the washer 54 and the washer 54 against the underface of the disc 44, a considerable amount of resistance to rotation of the nozzle member 50 is created, such resistance being greater than the power of the turbine 32. Because of the kinetic energy which has built up in the turbine 32 and impact member 70 during rotational movement thereof prior to contact of the shoulder 74 with the arm 80, when the shoulder 74 strikes the arm 80 it will cause the arm 80 and consequently the nozzle member 50 to be moved in a clockwise direction as viewed in Fig. 5 through a small arc of a circle before the kinetic energy in the turbine 32 and impact member 70 is exhausted.

It will be appreciated that although the shoulder 74 is disposed radially with respect to the axis of rotation of the turbine 32 and the surface of the arm 80 which it contacts is also radially or approximately radially disposed with respect to such axis of rotation, the direction in which pressure is applied to the impact member 70 through its pivotal screw 70 is at an angle to the plane of contact between the shoulder 74 and the arm 80 and, consequently, when the shoulder 70 strikes the arm 80 continued pressure on the impact member 70 tending to rotate it causes the impact member 70 to be cammed inwardly, or moved in a counterclockwise direction of rotation about the screw 72 as viewed in Fig. 5, until the shoulder 74 clears the inner edge of the arm 80. When the shoulder 74 thus clears the inner edge of the arm 80, the restriction to rotation of the turbine 32 is relieved whereupon the water flowing through the openings 40 causes the turbine 32 to make another complete rotation during which time the impact member 70 again swings outwardly into contact with the inner surface of the body 20 so as to again bring the shoulder 74 into contacting relation with the arm 80 at the completion of another revolution to again drive the arm 80 and nozzle member 50 through a limited angle of rotation before the impact member 70 is again released from the arm 80.

This rotation of the turbine 32 with the resultant impact of the member 70 through the shoulder 74 against the arm 80 and consequent advance of the arm 80 and nozzle member 50 through a small degree of rotation continues during operation of the device, with the result that the nozzle member 50 is caused to rotate intermittently through relatively small degrees of angular movement but in a substantially continuous manner. As a matter of fact the amount of movement imparted to the nozzle member 50 upon each impact by the member 70 is so small as to be almost imperceptible to the eye of the ordinary observer but is repeated at such frequent intervals as to create the impression that the nozzle member 50 is rotating slowly at a uniform and continuous speed. The net result of the construction is that the nozzle member 50 continues during operation to rotate at a relatively slow rate so that the water issuing from the orifices 62 and from the slot 60 is distributed in a more or less equal manner over the entire area within the range of the head.

One thing that may be noted at this point is that although the nozzle member 50 has a relatively loose fit in the bore 58 of the disc 44, the coacting surfaces of the disc 44, washer 54 and flange 52 of the nozzle member 50 are smooth and flat so that when the nozzle member 50 is pressed upwardly due to the water pressure within the body 20, the space between the nozzle member 50 and the bore 48 is effectively sealed against any material leakage.

The arm 80 may obviously be made integral with the nozzle member 50 and particularly the flange 52 thereof, as for instance as illustrated in the construction shown in Fig. 8, or it may be formed separately from the nozzle member and thereafter suitably fixed thereto. One thing has been noted in connection with the above described construction and that is that where the arm 80 is formed integrally with the flange 52 as illustrated in Fig. 8 the impact between the impact member 70 and the arm 80 produces a concussion which is telegraphed through the metallic parts of the system and is often audible in the associated residence and particularly in the water supply system thereof. I have found that if the arm 80 is sound insulated to a greater or lesser degree from the flange 52 that this audibility of the impact may be materially reduced if not entirely eliminated. It has been found that if a relatively thick body of solder is employed for securing the arm 80 to the flange 52, the audibility of the impact will be reduced because of the softness of the solder and its consequent resistance to the transmission of sound therethrough.

This construction is illustrated in Figs. 1 to 6, inclusive, and in Figs. 2 and 4 in particular it will be noted that the upper end of the arm 80 is inwardly turned as at 82 so as to overlie the upper surface of the flange 52 and the periphery of the flange 52 is notched out to permit the passage of the arm 80 therethrough, the notch being of a materially greater dimension than the width of the arm 80, and a relatively thick body of solder 84 is employed to fix the arm 82 to the flange 52 and serves to space the arm 80 and its inturned end 82 from direct contact with the flange 52 at all points in the connection. Such construction has been found to be effective in materially reducing the audibility of the impact between the shoulder 74 of the impact member 70 and the arm 80.

This same feature of insulating the arm from the nozzle member may be carried to a still further extent in event the audibility of the aforementioned impact is not sufficiently reduced by the above described method, and such further construction is illustrated in Fig. 7. In Fig. 7 the nozzle member 50 is identical to the nozzle member 50 in the previous view except that it is externally threaded immediately above the flange 52. The arm on the nozzle member here indicated at 80' is identical to the arm 80 previously described below the nozzle member 50 but above the nozzle member it is provided with an annular offset portion 86 in which the nozzle member 50 above its flange 52 is loosely received. The peripheral edge of the flange 52 is notched for passage of the arm 80' therethrough the same as in the previous construction. The annular portion 86 of the arm 80' is insulated from the flange 52 by means of a non-metallic washer member 88. A similar non-metallic washer member 90 overlies the upper face of the annular portion 86 and is provided with an axially directed portion 92 which serves to space the bore of the portion 86 from that portion of the nozzle member 50 received within it. A metallic washer 94 overlies the non-metallic washer 90 and a nut 96 is threaded upon the lower end of the nozzle member 50 against the washer 94 and serves to effectively clamp all of the aforementioned parts securely between it and the flange 52. It may also be noted that the lower non-metallic washer 88 is split adjacent the notch through which the arm 80' passes through the flange 52 and the adjacent portions of the washer 88 are bent downwardly so as to insulate the arm 80' against direct metallic contact with the walls of such notch. The various washers and the nut 96 in this construction takes the place of the washer 54 in the previously described construction. It will be appreciated that with the construction illustrated in Fig. 7 the arm 80' is thoroughly insulated by non-metallic material from the nozzle member and particularly where such non-metallic material is of a relatively soft and yieldable nature it not only prevents the transmission of sound to the nozzle member but materially deadens the audibility of the impact between the shoulder 74 and the arm 80'.

One of the important features of the present invention is the adaptability of the construction thus far described to a simple modification to adapt it to sprinkle any area from a full circle to any segment of such circle. For instance, it may be readily adapted to cover three-quarters of a circle, half a circle, a quarter of a circle, or any segmental area between, or in excess or less than, these values. The manner in which this is done is illustrated in Figs. 8 and 9. Except for the added element required to effect this result the construction illustrated in Fig. 9 is identical to that illustrated in Fig. 2 with the exception that as previously described, in Fig. 8 the arm 80 is shown as being formed integrally with the flange 52 of the nozzle member 50.

In the construction illustrated in Figs. 8 and 9 the body 20 and nozzle member 50 are identical to the same parts illustrated in Fig. 2 except the nozzle member is not slotted as at 60 in the preceding constructions. The disc 44' which closes the upper end of the body 20 is substantially identical to the disc 44 previously described except that the bore 48' thereof is of greater diameter in this instance. In this case a sleeve member 190 of substantially the same length as the nozzle member 50 loosely surrounds the nozzle member 50 as indicated. The lower end of the sleeve member 190 is outwardly flanged as at 192, the flange 192 lying between the flange 52 and the disc 44' in the same manner as the washer 54 previously described and serves to replace it in this construction. The sleeve 190 is relatively loosely received within the bore 48' so as to be vertically projectable upwardly therethrough with the nozzle 50 when water pressure is applied to the interior of the body 20. The sleeve 190 is prevented from turning with respect to the body 20 by means of a pin 194 which is fixed at its lower end in the flange 192 and projects upwardly therefrom through the disc 44' which is provided with an opening 196 therein for loosely receiving the same.

The sleeve 190 at a point thereon substantially horizontally aligned with the orifices 62 in the nozzle member 50 when the nozzle member 50 is in its fully upwardly projected position, is provided with a segmentally shaped slot 198 therein and through which the water discharged from the orifices 62 is required to pass in flowing from the nozzle member. The slot 198 is of sufficiently great depth as not to interfere with water flowing through the orifices 62 when aligned therewith. Obviously the angular extent of the slot 198 will determine the angularity of the segmental area over which the spray head in its modified construction will be effective in its sprinkling operation, the unslotted portion acting as a shroud to close the discharge openings or orifices 62 over the remaining segmental area of the complete circle. In the particular construction shown and as best brought out in Fig. 9, the angular extent of the slot 198 shown is such that the spray head will cover approximately a half circle area. It will be appreciated that by varying the angular extent of the slot 198 to anything less than a full circle, and desired angularity of the segmental area through which it is desired to have the spray head effective may be readily obtained. It will be appreciated that the sleeve 190 angularly beyond that area in which the slot 198 is provided therein simply serves to close off the particular orifice or orifices 62 in the nozzle member 50 as it turns behind it, and as soon as any orifice 62 in turning with the nozzle member 50 within the sleeve 190 passes beyond the solid portion of the sleeve 190 and is uncovered by the slot 198 it will be instantly rendered effective during its passage through the angular extent of the slot 198.

As will be readily appreciated, the only change required to transform a standard full circle type of spray head such as illustrated in Fig. 2 to the type illustrated in Fig. 8 is the addition of the sleeve member 190 and its pin 194 together with a disc 44' of slightly different construction from the disc 44 employed in the full spray type of head. The importance of this feature from a commercial standpoint will be readily recognized.

A further feature of the present invention is in connection with the means shown for adjusting the height of the spray head 16 with respect to the surface of the lawn during and after installation. The conventional practice at the present time is to form the body for the spray head (equivalent to the body 20) with a threaded bore at its lower end and employ a separate nipple to connect such body with the upwardly directed branch of the Y in the supply line (equivalent to the Y 14 shown). As will be readily appreciated such nipples are provided with the usual type of pipe thread, as are also the body and the Y, so that it is impossible, without danger of undue leakage, to attempt to obtain any great amount of vertical adjustment of the head with respect to the Y by simply screwing or unscrewing the spray head on the nipple. Ordinarily it requires that the spray head and nipple be removed from the Y, and a new nipple of the proper length inserted into the spray head and then the spray head and nipple returned to position with the nipple threaded into Y.

The distance between the surface of the ground and the supply line, such as the supply line 10 illustrated in Fig. 1, often varies in service to a greater or lesser extent. This may be caused by various reasons such as heaving of the ground due to frost, freezing, or the like, settling of the ground particularly in a new lawn, settling of the pipe 10 in the soil of the lawn, or the like. The top of the spray head should be maintained substantially flush with the surface of the lawn for optimum results as well as to escape possible damage from contact with lawn mowers or the like, and for this reason the time and expense involved to maintain the various spray heads of an underground sprinkling system in proper position with respect to the surface of the lawn is often relatively great particularly where it requires the replacement of a number of the nipples with ones of different lengths.

In order to avoid to a large measure such expense as above described in connection with the adjustment of the height of the spray heads in service, in accordance with the present invention the lower end 24 of the bodies 20 are made of relatively great length as indicated in Fig. 1 and the major portion of this length is externally threaded as indicated. The upper branch of the Y's 14 are also provided with a relatively extended vertical collar portion 110 internally threaded for direct reception of the lower end of the portion 24. The relative length of these portions are such as to permit a relatively great amount of vertical adjustment of the spray head 16 with respect to the pipe line 10, the amount provided being preferably sufficient to cover any ordinary variation in height between the surface 12 of the ground and the pipe line 10 in service. A lock nut 112 is preferably provided on the threaded lower end of each spray head 16 so as to enable the vertically adjusted position of the spray head to be maintained, but more important to permit the spray heads of the partial circle type, such for instance as illustrated in Figs. 8 and 9, to be locked in a proper rotatably adjusted position.

With the construction illustrated in Fig. 1 and thus described, should it be necessary, for instance, to lower a spray head 16 by a distance, for example, one-half an inch, the spray head 16 is simply threaded out of its Y 14, the nut 112 is run up a half inch on the lower portion 24 of the spray head and it is simply returned to position and threaded downwardly until the nut 112 abuts and locks against the upper end of the Y. The operation may obviously be carried on in a very short length of time and without requiring the replacement of any part of the system whatsoever.

Formal changes may be made in the specific embodiments of the invention described without departing from the spirit and substance of the invention, the scope of which is commensurate with the appended claims.

What I claim is:

1. In a sprinkler head including a hollow body having a water inlet and a nozzle member carried thereby and rotatable with respect thereto, the combination of means for effecting rotation of said nozzle member in a series of intermittent angular movements comprising an element in said body rotatable therein under the influence of the flow of water between said inlet and said nozzle member, a second element swingably mounted at one end thereof upon the first mentioned element about a line eccentric to the axis of rotation of said first mentioned element and provided with a radially directed shoulder, and means carried by said nozzle member disposed in the normal path of movement of said shoulder.

2. In a sprinkler head including a hollow body having a water inlet and a nozzle member carried thereby and rotatable with respect thereto, the combination of means for effecting rotation of said nozzle member in a series of intermittent angular movements comprising an element in said body rotatable therein under the influence of the flow of water between said inlet and said nozzle member, a second element swingably mounted at one end thereof upon the first mentioned element about a line eccentric to the axis of rotation of said first mentioned element and provided with a radially directed shoulder, means for directing a stream of water against said swinging element in a direction tending to move said shoulder radially outwardly with respect to the axis of rotation of the first mentioned member, and means carried by said nozzle member disposed in the normal path of movement of said shoulder.

3. In a sprinkler head, in combination, a hollow body having a water inlet, a nozzle member rotatably supported by said body for the discharge of water therefrom, means in said body intermediate said inlet and said nozzle member rotatable under the influence of a flow of water through said body, means coacting between said rotating means and said nozzle member operable to apply a continuous succession of impact blows on said nozzle member tending to effect rotation thereof, the last mentioned means comprising a member swingably mounted at one end thereof on the first mentioned means about a line eccentric to the axis of rotation of said first mentioned means and provided with a shoulder movable therewith toward and from the axis of said nozzle member, and means secured to said nozzle member projecting into the normal path of movement of said shoulder.

4. In a sprinkler head, in combination, a hollow body having a water inlet, a nozzle member rotatably supported by said body for the discharge of water therefrom, means in said body intermediate said inlet and said nozzle member rotatable under the influence of a flow of water through said body, means coacting between said rotating means and said nozzle member operable to apply a continuous succession of impact blows on said nozzle member tending to effect rotation thereof, the last mentioned means comprising a member pivotally mounted at one end thereof on the first mentioned means about a line eccentric to the axis of rotation of said first mentioned means and provided with a shoulder movable therewith toward and from the axis of said nozzle member, means for directing a stream of water against said movable member during operation of said sprinkler head constantly urging said shoulder outwardly away from the axis of rotation of said nozzle member, and means secured to said nozzle member projecting into the normal path of movement of said shoulder.

5. In a sprinkler head, in combination, a hollow body having a water inlet, a nozzle member rotatably supported by said body for the discharge of water therefrom, means in said body intermediate said inlet and said nozzle member rotatable under the influence of a flow of water through said body, means coacting between said rotating means and said nozzle member operable to apply a continuous succession of impact blows on said nozzle member tending to effect rotation thereof, the last mentioned means comprising a member pivotally mounted at one end thereof on the first mentioned means about a line eccentric to the axis of rotation of said first mentioned means and provided with a shoulder movable therewith toward and from the axis of said nozzle member, means for applying a stream of water against said movable member thereby to constantly urge said movable member in a direction to move said shoulder outwardly away from the axis of rotation of said nozzle member during operation, and means secured to said nozzle member projecting into the normal path of movement of said shoulder.

6. In a sprinkler head, in combination, a hollow body having a water inlet, a nozzle member rotatably supported by said body for the discharge of water therefrom, means in said body intermediate said inlet and said nozzle member rotatable under the influence of a flow of water through said body, means coacting between said rotating means and said nozzle member operable to apply a continuous succession of impact blows on said nozzle member tending to effect rotation thereof, the last mentioned means comprising a member swingably mounted on the first mentioned means about a line eccentric to the axis of rotation thereof and provided with a shoulder movable therewith toward and from the axis of said nozzle member, and means secured to said nozzle member projecting into the normal path of movement of said shoulder comprising an arm and means resistant to the transmission of sound therethrough securing said arm to said nozzle member.

7. A sprinkler head comprising, in combination, a hollow body, a nozzle member rotatably mounted thereon and having an orifice therein for the discharge of liquid therefrom, means within said body operated by the flow of liquid therethrough operatively connected to said nozzle member for effecting rotation thereof, a non-rotatable sleeve surrounding at least that portion of said nozzle member in which said orifice is located, and a slot in said sleeve having an angular extent of less than 360° adapted to become aligned with said orifice during rotation of said nozzle member and through which the projection of water from said orifice is limited.

8. In a sprinkler head, in combination, a hollow body having a water inlet, a nozzle member rotatably connected therewith for the discharge of water therefrom, said nozzle member having an opening therein for the discharge of water through said nozzle member, a non-rotatable sleeve surrounding the said portion of said nozzle member in which said opening is located, means within said body operated by the flow of water therethrough operatively connected to said nozzle member for effecting rotation thereof, and said sleeve having an opening therethrough adapted to be aligned with said opening in said nozzle member only during rotational movement of said nozzle member through a predetermined angular movement of less than 360°.

9. In a sprinkler head, in combination, a hollow body having a water inlet and a wall having an opening therethrough, a nozzle member projectable and retractable through said opening and having a discharge orifice therein positioned externally of said body when said nozzle member is in projected position, means within said body operated by the flow of water therethrough operatively connected to said nozzle member for effecting rotation thereof, a sleeve surrounding at least a portion of said nozzle member when said nozzle member is in projected position, means for maintaining said sleeve against rotation, and a slot in said sleeve extending over an angular extent less than 360° through which water from said orifice may be discharged during rotation of said nozzle member.

10. In a sprinkler head, in combination, a hollow body having a water inlet and a wall having an opening therethrough, a nozzle member projectable and retractable through said opening and having a discharge orifice therein positioned externally of said body when said nozzle member is in projected position, means within said body operated by the flow of water therethrough operatively connected to said nozzle member for effecting rotation thereof, a sleeve surrounding at least a portion of said nozzle member and projectable and retractable through said opening therewith, means for maintaining said sleeve against rotation, and a slot in said sleeve extending over an angular extent less than 360° through which water from said orifice may be discharged during rotation of said nozzle member.

11. In a sprinkler head, in combination, a hollow body having an inlet for the flow of water thereinto, a nozzle member rotatably supported by said body and having a portion positioned within said housing when said head is not operating and projectable therefrom under the influence of a flow of water into said body and provided with discharge openings therein, means intermediate said inlet end and said nozzle member operable by the flow of water through said body for effecting rotation of said nozzle member, and shrouding means arranged in cooperative relation around said projectable portion for limiting the flow of water through said discharge opening.

12. In a sprinkler head, in combination, a hollow body having an inlet for the flow of water thereinto, a nozzle member reciprocably mounted in said body and for rotation relative thereto having a portion projectable from said body upon the introduction of water under pressure through said inlet, said projectable portion having at least one water discharge opening therein, means interiorly of said body operable by the flow of water therethrough for effecting rotation of said nozzle member, and means projectable from said body with said projectable portion cooperable with said discharge opening to control the flow of water therefrom.

13. In a sprinkler head, in combination, a hollow body having an inlet for the flow of water thereinto, a nozzle member reciprocably mounted in said body and for rotation relative thereto having a portion projectable from said body upon the introduction of water under pressure through said inlet, said projectable portion having at least one water discharge opening therein, means interiorly of said body operable by the flow of water therethrough for effecting rotation of said nozzle member, and a non-rotatable member projectable with said projectable portion cooperable with said nozzle member to control the flow of water from said discharge opening.

14. In a sprinkler head, in combination, a hollow body having an inlet for the flow of water thereinto, a nozzle member reciprocably mounted in said body and for rotation relative thereto having a portion projectable from said body upon the introduction of water under pressure through said inlet, said projectable portion having at least one water discharge opening therein, means interiorly of said body operable by the flow of water therethrough for effecting rotation of said nozzle member, a sleeve surrounding said projectable portion and projectable from said body therewith cooperable with said projectable portion to control the flow of water from said discharge opening, and means for holding said sleeve against rotation with respect to said nozzle member.

15. In a sprinkler head, in combination, a hollow body having an inlet for the flow of water thereinto, a nozzle member reciprocably mounted in said body and for rotation relative thereto having a portion projectable from said body upon the introduction of water under pressure through said inlet, said projectable portion having at least one water discharge opening therein, means interiorly of said body operable by the flow of water therethrough for effecting rotation of said nozzle member, a sleeve carried by said nozzle member in surrounding relation with respect thereto and projectable from said body with said projectable portion of said nozzle member, and means for maintaining said sleeve against rotation with respect to said body member, said sleeve cooperating with said projectable portion to control the flow of water from said discharge opening.

JOHN A. BROOKS.